(12) United States Patent
Koide et al.

(10) Patent No.: US 6,975,803 B2
(45) Date of Patent: Dec. 13, 2005

(54) OPTICAL FIBER END FACE CLEANER

(75) Inventors: Kiyohito Koide, TachikAwai (JP); Yuichi Koreeda, Hachioji (JP); Jun Takeda, Ome (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 180 days.

(21) Appl. No.: 10/620,907

(22) Filed: Jul. 15, 2003

(65) Prior Publication Data

US 2005/0013577 A1 Jan. 20, 2005

(51) Int. Cl.$^7$ ................................................. G02B 6/00
(52) U.S. Cl. ..................................... 385/134; 385/147
(58) Field of Search ............................... 385/134, 139, 385/147

(56) References Cited

U.S. PATENT DOCUMENTS

| | | | | |
|---|---|---|---|---|
| 5,220,703 A | * | 6/1993 | Kanayama et al. | 15/210.1 |
| 5,381,498 A | * | 1/1995 | Bylander | 385/83 |
| 6,086,263 A | * | 7/2000 | Selli et al. | 385/88 |
| 6,125,227 A | * | 9/2000 | Cox | 385/134 |
| 6,821,025 B2 | * | 11/2004 | Gerhard | 385/85 |
| 2004/0005134 A1 | * | 1/2004 | Sun et al. | 385/134 |
| 2004/0033050 A1 | * | 2/2004 | Lytle et al. | 385/147 |

FOREIGN PATENT DOCUMENTS

| | | |
|---|---|---|
| JP | 2530291 Y2 | 12/1996 |
| JP | 2000-314822 A | 11/2000 |

* cited by examiner

*Primary Examiner*—Sung Pak
(74) *Attorney, Agent, or Firm*—Frishauf, Holtz, Goodman & Chick, P.C.

(57) ABSTRACT

There is provided an optical fiber end face cleaner which is easy to carry and make preparations for use, facilitates cleaning operation, and what is more, makes it possible to positively remove or clear away attached materials from end faces of optical fibers without causing any of the removed materials to adhere to the end faces again. The optical fiber end face cleaner includes at least one elastic base formed by an elastic member having a flat surface of a predetermined size, and a predetermined thickness in a direction perpendicular to the surface. An adhesive layer is formed on a surface of the elastic base, for allowing the end faces of the optical fibers to be pressed against the adhesive layer to cause deposits on the end faces to adhere to the adhesive layer for removal.

6 Claims, 6 Drawing Sheets

OPTICAL FIBER END FACE CLEANER

BACKGROUND OF THE INVENTION

1. Field of the Invention

This invention relates to an optical fiber end face cleaner, and more particularly to an optical fiber end face cleaner for cleaning the end face by removing deposits adhering to an end face of an optical fiber.

2. Prior Art

Optical fiber-connecting methods of connecting optical fibers by butting ends thereof against each other include, for example, methods illustrated in FIGS. 4A to 4C. Referring first to FIG. 4A, there is shown a method implemented by the simplest connecting structure in which two optical fibers 510a, 510b are connected to each other simply by using a ferrule 550. FIG. 4B shows another connecting method in which a connecting board 560 formed with a plurality of V-grooves 561, and a connecting board 570 similarly formed with a plurality of V-grooves 571 have groove-side surfaces thereof butted against and brought into contact with each other such that the V-grooves 561, 571 cooperate to form pipes having inner walls quadrilateral in cross section, and the respective pipes have first optical fibers 510a inserted from one ends thereof, and second optical fibers 510b inserted from the other ends thereof, such that the optical fibers 510a, 510b are connected by butting ends thereof against each other.

Further, FIG. 4C shows a plug and receptacle-type optical fiber connectors 500, 600. This method is configured such that a plurality of optical fibers 510 protruding from a connector housing 520 of the optical fiber connector 500 are introduced into respective optical fiber holding/introducing passages, not shown, formed in a housing 620 of the optical fiber connector 600, and ends of the optical fibers 510 and ends of optical fibers, not shown, held in the optical fiber holding/introducing passage are butted against and brought into contact with each other for connection of the optical fibers. It should be noted that generally, the above optical fibers have a diameter of 0.125 mm or so.

In the above structures for connecting the optical fibers, the optical fibers (510a, 510b, etc.) are inserted into pipe-like introducing passages having inner walls circular or quadrilateral in cross section, from respective opposite ends of the passages, and the ends of the optical fibers are butted against each other for connection of the optical fibers. Therefore, when the optical fibers are inserted into the annular introducing passages, the inner walls of the passages are sometimes scraped by distal ends of the optical fibers, and undesirable scrapings can be attached to the end faces of the optical fibers, or airborne materials sometimes adhere to the end faces of the same. In these cases, there occurs a problem that these materials or deposits attached to the end faces cause degradation of performance of optical connection of the optical fibers.

To overcome the above problem, it is necessary to remove materials attached to the end faces of the optical fibers. The simplest and basic method for solving the problem includes, for example, a method of cleaning end faces 511 of the optical fibers 510 by removing deposits 515 attached to the end faces 511 using a gauze 700 or the like impregnated with ethyl alcohol, as shown in FIG. 5A, and a method of cleaning the end faces 511 by blowing air to the end faces 511 with an air spray 720, thereby blowing off the deposits 515, as shown in FIG. 5B.

Further, as shown in FIG. 6A, there has been proposed an optical fiber end face cleaner 740 (as disclosed e.g. in the Publication of Utility Model Registration No. 2530291), which is constructed by attaching an elastic body 742 to an end of a stem 741 and further wrapping a cleaning cloth 743 around the elastic body 742 and the end of the step 741. This cleaner (740) is convenient for cleaning the end face of an optical fiber located in a recessed place. Further, the elastic body 742 is deformed in accordance with shapes of surroundings, the end face of an optical fiber, etc., which makes it possible to enhance the cleaning effect. As shown in FIG. 6B, there has been proposed another optical fiber end face cleaner 760 (as disclosed e.g. in Japanese Laid-Open Patent Publication (Kokai) No. 2000-314822), which is configured such that a cushion sheet 765 is disposed in a recessed bottom surface of a main casing 761 to laminate a cleaning sheet 764 over the cushion sheet 765, and a surface plate 762 with an opening window 763 is disposed over the cleaning sheet 764. According to this cleaner (760), the end faces of the optical fibers are pressed against the cleaning sheet 764 exposed through the opening window 763 and moved thereon, whereby deposits are removed from the end faces of the optical fibers. The cushion sheet 765 enables the end faces of the optical fibers to be brought into intimate contact with the cleaning sheet 764 and moved thereon with a moderate pressure applied to the cleaning sheet 764. This contributes to enhancement of the cleaning effect.

The conventional cleaners described above suffer from the following problems: In the case of the device using the gauze 700 or the like impregnated with ethyl alcohol, since the optical fibers have a small diameter of 0.125 mm, the user is required to clean the end faces of the optical fibers while magnifying and monitoring the end faces under a microscope. Therefore, it takes a lot of time to perform cleaning operation, and moreover, preparations of the magnifying device, ethyl alcohol, etc. necessary for cleaning operation make it difficult to readily carry out the clearing operation. In the case of the method of blowing air by the air spray 720, the effects of removal of the deposits or attached material are insufficient. In the case of the cleaner 740 having the elastic body 742 and the cleaning cloth 743 arranged at the end of the stem 74, although this cleaner 740 is suitable for cleaning an optical fiber located in a recessed place due to its stick-like shape and deformability of the elastic body 742, there is a fear that deposits once removed from the end face of the optical fiber by the cleaning cloth 743 fall off the cleaning cloth 743 to adhere to the end face of the optical fiber again. Further, in the case of the cleaner 760 having the cushion sheet 765 laminated with the cleaning sheet 764 in the main casing 761, although the cleaning effect can be increased by the moderate pressure applied to the cleaning sheet 764 by the end faces of the optical fibers, deposits once removed can adhere to the end faces of the optical fibers again, similarly to the case of the stick-like cleaner 740.

SUMMARY OF THE INVENTION

It is an object of the invention to provide an optical fiber end face cleaner which is easy to carry and make preparations for use, facilitates cleaning operation, and what is more, makes it possible to positively remove or clear away deposits from end faces of optical fibers without causing any of the removed deposits to adhere to the end faces again.

To attain the above object, the present invention provides an optical fiber end face cleaner for cleaning an end face of an optical-fiber by removing deposits on the end face of the optical fiber, comprising:

at least one elastic base formed by an elastic member having one flat surface of a predetermined size, and a predetermined thickness in a direction perpendicular to the surface; and at least one adhesive layer formed on a predetermined area of a surface of the elastic base, for allowing the end face of the optical fiber to be pressed against a surface of the adhesive layer.

This optical fiber end face cleaner is easy to carry and make preparations for use. While the cleaning operation by the cleaner is very simple and easy, i.e. just to press the end face of the optical fiber against the surface of the adhesive layer, due to the elastic effect provided by the elastic base, the whole surface of the optical fiber can be pressed against the adhesive layer with appropriate pressure, which makes it possible to cause deposits or material attached to the end face to be positively removed and adhered to the adhesive layer. Moreover, since no deposits once adhered to the adhesive layer come off from the adhesive layer, none of the removed deposits are attached to the end face of the optical fiber again, whereby it is possible to positively remove the deposits from the end face of the optical fiber, for cleaning.

Preferably, the at least one elastic base comprises a plurality of elastic bases, and the at least one adhesive layer comprises a plurality of adhesive layers, and the plurality of elastic bases and the plurality of adhesive layers form a plurality of laminated optical fiber end face cleaner units, each comprising one elastic base, and one adhesive layer formed on the one elastic base, and sequentially laminated such that the adhesive layer of one optical fiber end face cleaner unit is adhered to a back surface of the elastic base of another optical fiber end face cleaner adjacent to the one optical fiber end face cleaner unit, for allowing the laminated optical fiber end face cleaner units to be sequentially peeled off one by one from a foremost unit side.

According to this preferred embodiment, a plurality of optical fiber end face cleaners can be easily held and carried, and if the cleaning effect of one unit is reduced, only the unit is peeled off for disposal, and the end face of the optical fiber can be cleaned by a new unit having an adhesive layer unused. Thus, it is possible to enhance cleaning efficiency of the cleaner.

More preferably, the adhesive layers of the laminated optical fiber end face cleaner units are configured to have respective areas progressively decreased in size in a forward direction of lamination of the laminated optical fiber end face cleaner units.

According to this preferred embodiment, the adhesive power of a foremost unit in actual use is smaller than that of any rearward one, and hence it is possible to peel off the foremost unit more easily.

Preferably, the optical fiber end face cleaner further comprises a holder casing for holding and accommodating the laminated optical fiber end face cleaner units, the holder casing having a cleaning window formed therein for allowing the end face of the optical fiber to be pressed against the adhesive layer of a foremost one of the laminated optical fiber end face cleaner units for cleaning thereof.

According to this preferred embodiment, the optical fiber end face cleaner is configured to be a laminated-type optical fiber end face cleaner accommodated in the holder casing. This makes it possible to further facilitate the carrying and storing of the cleaner as well as the operation of cleaning the end face of the optical fiber.

Further preferably, the holder casing includes a spring for urging a rearmost one of the laminated optical fiber end face cleaner units held and accommodated therein forward from a back side of the elastic base of the rearmost one.

According to this preferred embodiment, the laminated-type optical fiber end face cleaner can be stably held in a state of an adhesive layer of the foremost unit being exposed through the cleaning window of the holder casing, and further, the end face of the optical fiber can be pressed against the adhesive layer with an appropriate force. This makes it possible to further facilitate the cleaning operation by the cleaner.

The above and other objects, features and advantages of the present invention will become more apparent from the following detailed description taken in conjunction with the accompanying drawings.

DETAILED DESCRIPTION OF THE PREFERRED EMBODIMENTS

Next, the present invention will now be described in detail with reference to drawings showing preferred embodiments thereof.

Figure 1A:
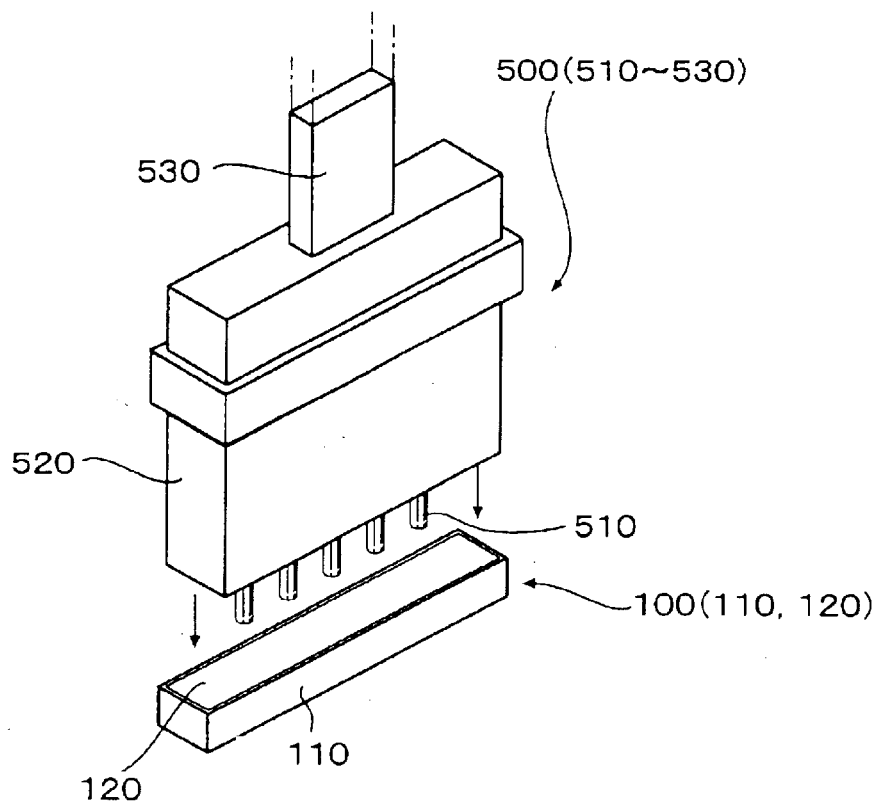
FIG. 1A is a perspective view of an optical fiber end face cleaner according to a first embodiment of the present invention, which is useful in explaining cleaning operation carried out by the same.
Figure 1B:
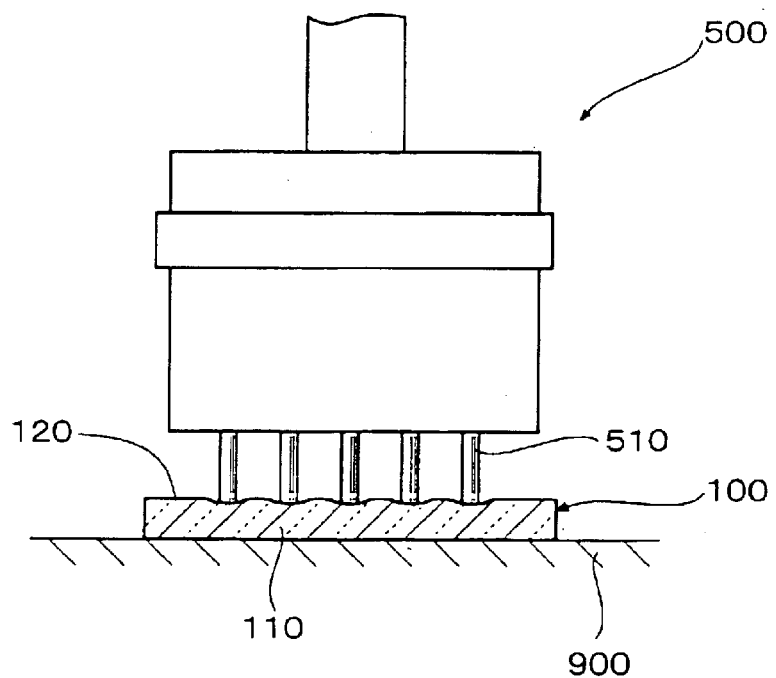
FIG. 1B is a partial cross-sectional view of the optical fiber end face cleaner according to the first embodiment of the present invention, which is useful in explaining the cleaning operation carried out by the same.

FIGS. 1A and 1B are a perspective view and a partial cross-sectional view, respectively, showing an optical fiber end face cleaner according to a first embodiment of the present invention, which are useful in explaining cleaning operation carried out by the same.

An optical fiber end face cleaner 100 according to the first embodiment is comprised of an elastic base 110 which is formed by an elastic member having one flat surface of a predetermined size and a predetermined thickness in a direction perpendicular to the surface, and an adhesive layer 120 formed on substantially all the surface of the elastic base 110 in a manner bonded to the elastic base 100, for allowing end faces of optical fibers 510 to be pressed against the surface of the adhesive layer 120.

It should be noted that the cleaner 100 has elongated sides extending in a direction corresponding to the direction of arrangement of a plurality of optical fibers 510 arranged in and held by an optical fiber connector 500, for allowing all end faces of the plurality of optical fibers 510 to be simultaneously pressed against the cleaner 100.

In using the optical fiber end face cleaner 100 according to the first embodiment constructed as above, first, the cleaner 100 is placed on a flat surface e.g. of a table 900, and the end faces of the plurality of optical fibers 510 of the optical fiber connector 500 are pressed against the surface of the adhesive layer 120 of the cleaner 100. At this time, the pressing force for pressing the end face of each optical fiber 510 is only required to be strong enough to slightly dent the surface of the adhesive layer 120 (see FIG. 1B). If the pressing force is too strong, there is a fear that the pressing force can deform the optical fibers 510, or break the adhesive layer 120. Inversely, if the pressing force is too weak, deposits attached to the end faces of the optical fibers 510 sometimes cannot be caused to adhere to the adhesive layer 120. When the pressing force is controlled to such an appropriate degree that the surface of the adhesive layer 120 is slightly dented, all the end faces of the optical fibers 510 are brought into intimate contact with the adhesive layer 120 by the elasticity of the elastic base 110, whereby it is possible to cause the deposits on the end faces of the optical fibers 510 to adhere to the adhesive layer 120. When the optical fibers 510 are detached from the adhesive layer 120, the deposits on the end faces thereof are removed from the end faces whereby the end faces are cleaned. Further, the deposits on the end faces of the optical fibers 510 are sometimes overlaid upon each other, and therefore, by repeatedly carrying out the pressing and detaching operations a plurality of times, it is possible to positively remove the deposits from the end faces of the optical fibers 510.

Although in the above embodiment, description has been given of the case in which the cleaner 100 is placed on the flat surface, and the end faces of the optical fibers 510 are pressed against the surface of the adhesive layer 120 of the cleaner 100, this is not limitative, but the cleaner 100 may be held between the user's fingers and the adhesive layer 120 thereof may be pressed against the end faces of the optical fibers 510.

Figure 2A:
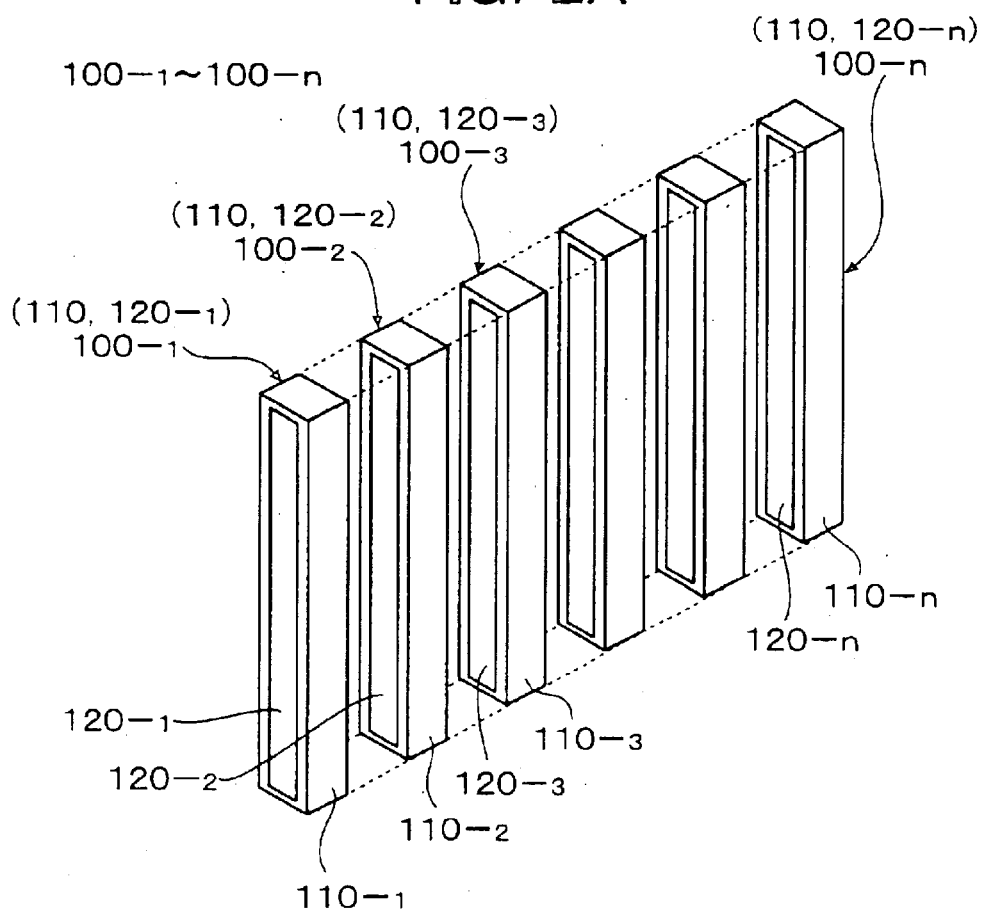
FIG. 2A is an exploded perspective view of an optical fiber end face cleaner according to a second embodiment of the present invention.
Figure 2B:
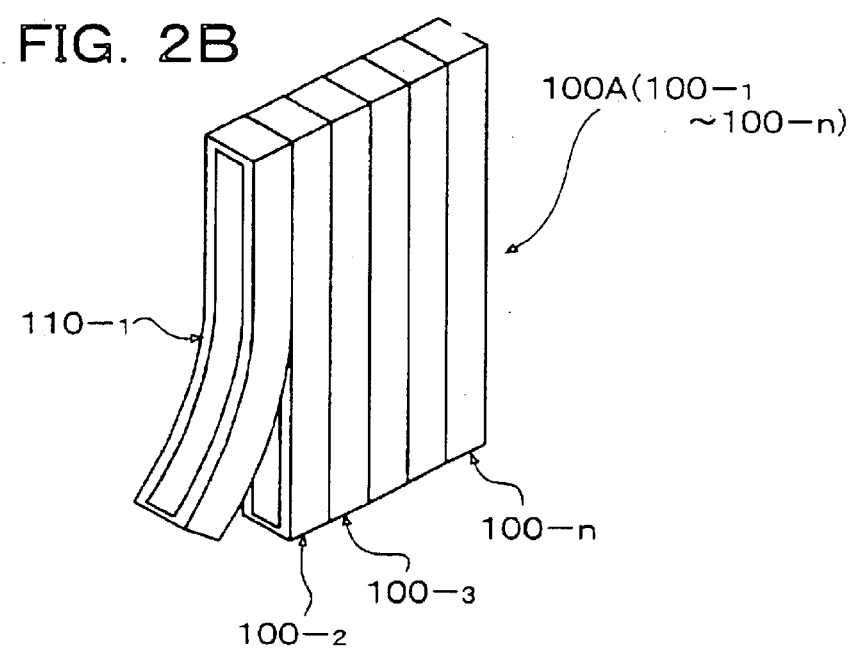
FIG. 2B is a perspective view of the optical fiber end face cleaner according to the second embodiment, illustrating a laminated state thereof.

FIG. 2A is an exploded perspective view of an optical fiber end face cleaner according to a second embodiment of the present invention. FIG. 2B is a perspective view of the optical fiber end face cleaner according to the second embodiment, which is useful in explaining a laminated state of a plurality of optical fiber end face cleaner units.

The second embodiment is a laminated-type optical fiber end face cleaner 100A which is constructed by sequentially laminating a plurality of unitary optical fiber end face cleaner units (100), each of which corresponds to the optical fiber end face cleaner 110 shown in FIG. 1, and is comprised of an elastic base (110) and an adhesive layer (120) formed on a surface of the elastic base (110), such that the adhesive layer (120) of one cleaner unit (100) is adhered to a back surface of the elastic base (110) of another cleaner unit (100) adjacent to the one cleaner unit (100). The plurality of laminated cleaner units 100-1 to 100-n are configured such that they can be sequentially peeled off one by one from the foremost side.

When a plurality of cleaners are carried or stored, if they are in a state separated from each other as single units, it is required, for example, to protect each of the adhesive layers (120) whereas in the case of the laminated-type cleaner, it is only required to protect the adhesive layer (120) of the foremost cleaner unit (100), and therefore, it is easy to carry and store the cleaners. Further, the laminated-type cleaner is easier to be held between the user's fingers, which facilitates operation for removing deposits. Further, when a lot of deposits have been attached to the adhesive layer (120) of the foremost cleaner unit (100), causing degradation of an adhesive effect of the layer, a new adhesive layer (120) can be exposed by peeling off only the foremost cleaner unit, which makes it easy to renew the adhesive layer (120).

As shown in FIG. 2A, the plurality of laminated cleaner units 100-1 to 100-n are configured such that the respective adhesive layers 120-1 to 120-n of the cleaner units have areas progressively decreased in size in the forward direction of lamination of the cleaner units (that is, the foremost adhesive layer (120-1) has the smallest area, and the rearmost adhesive layer (120-n) has the largest area). Due to this configuration, the adhesive powers of the adhesive layers 120-1 to 120-n are progressively reduced in the forward direction of lamination of the cleaner units, and hence when the foremost cleaner is to be removed, it is possible to easily peel off only the foremost one without peeling any of the rearward ones off the laminated-type cleaner 100A.

Figure 3A:
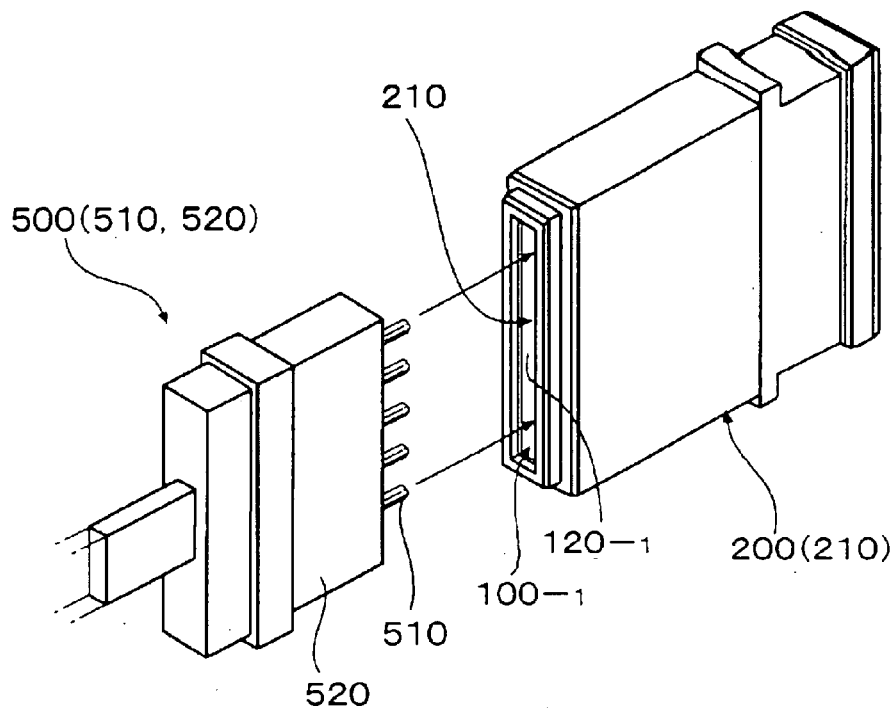
FIG. 3A is a perspective view of the appearance of an optical fiber end face cleaner according to a third embodiment of the present invention.
Figure 3B:
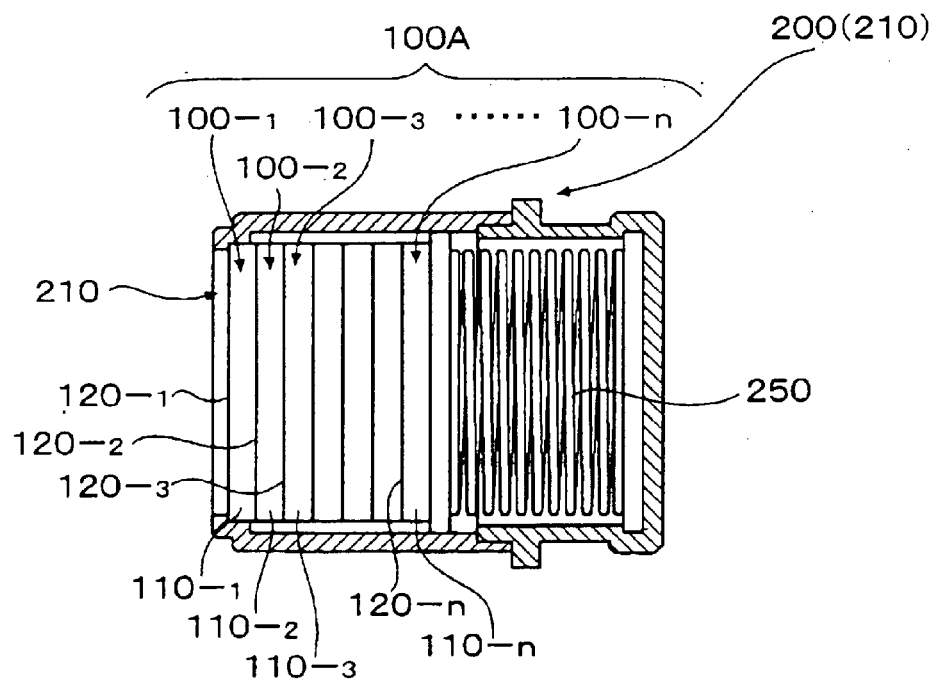
FIG. 3B is a cross-sectional side view of the optical fiber end face cleaner according to the third embodiment.
Figure 4A:
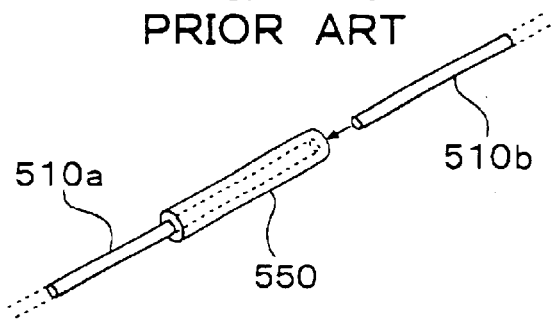
FIGS. 4A to 4C are perspective views and a partial cross-sectional perspective view of optical fibers whose end faces are to be cleaned by an optical fiber end face cleaner, which is useful in explaining structures for connecting the end faces of the optical fibers.
Figure 4B:
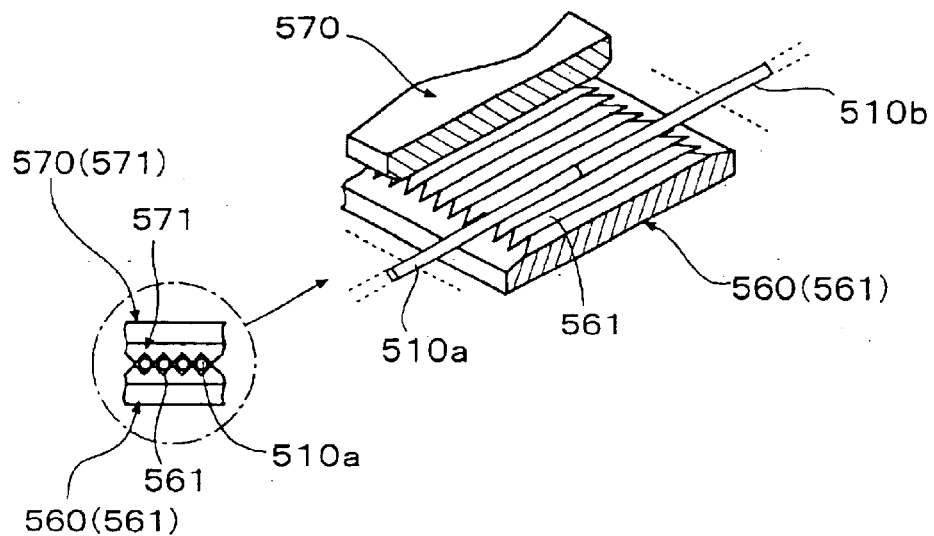
Figure 4C:
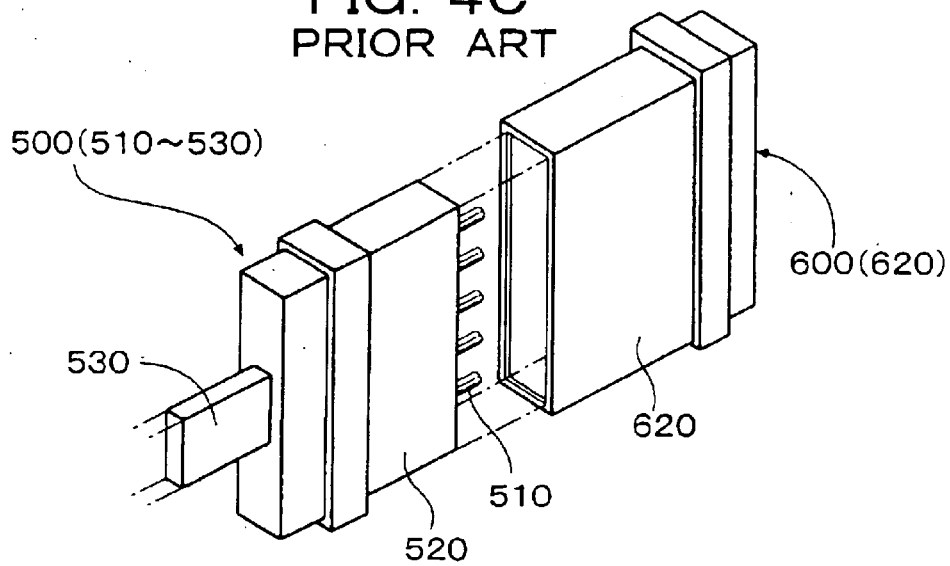
Figure 5A:
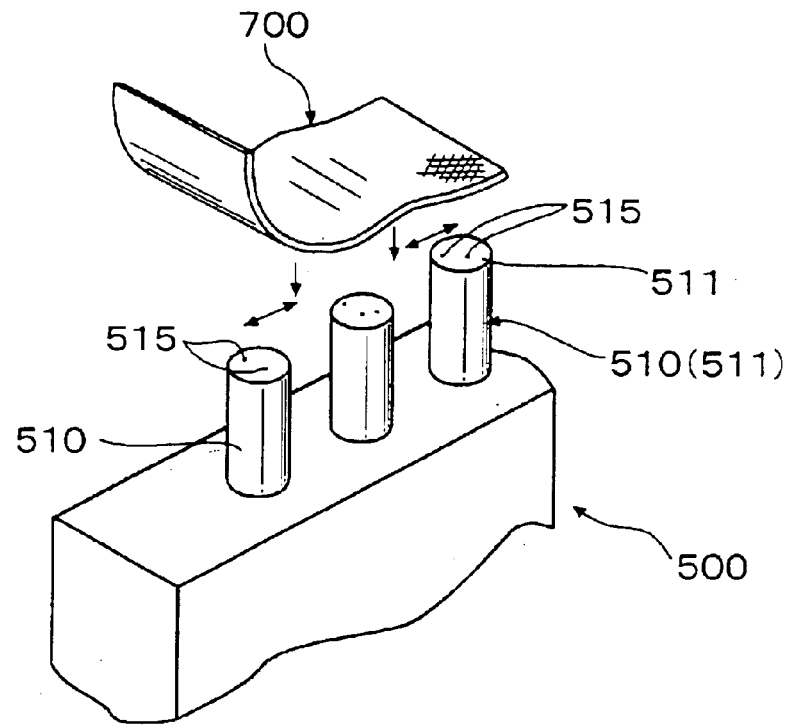
FIGS. 5A and 5B are perspective views of two simplest and basic examples of conventional optical fiber end face cleaners.
Figure 5B:
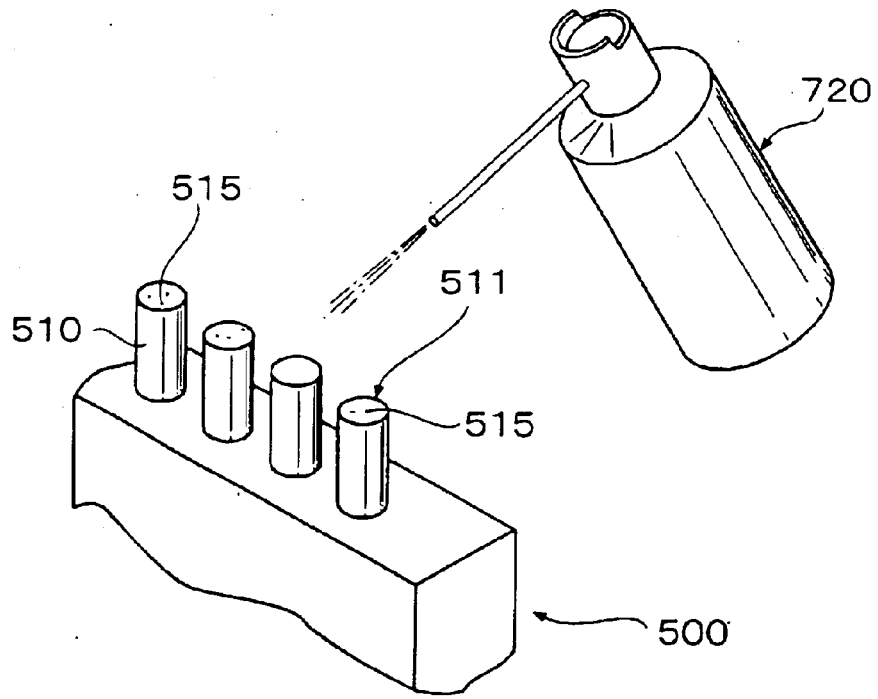
Figure 6A:
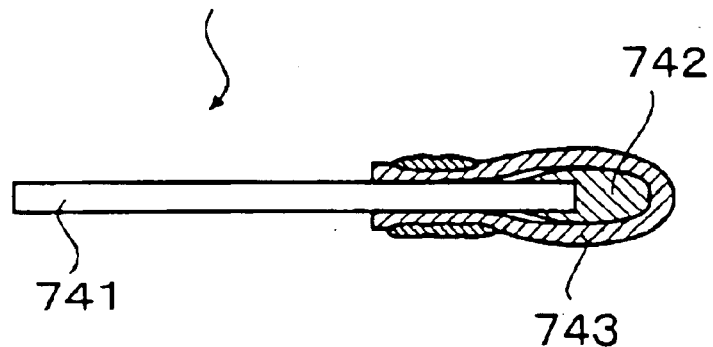
FIGS. 6A and 6B are cross-sectional side views of two other examples of conventional optical fiber end face cleaners.
Figure 6B:
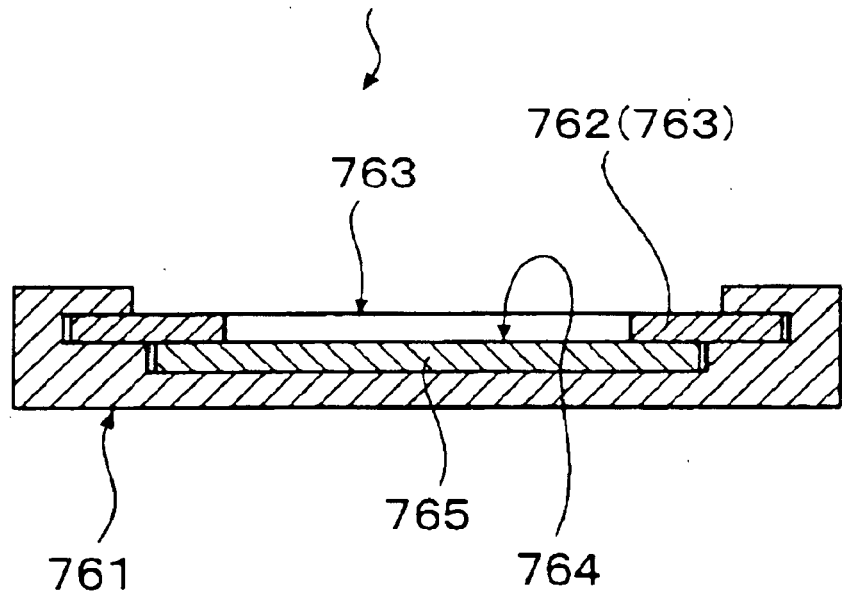

FIG. 3A is a perspective view of the appearance of an optical fiber end face cleaner according to a third embodiment of the present invention, and FIG. 3B is a cross-sectional side view of the optical fiber end face cleaner according to the third embodiment.

The third embodiment is a laminated-type optical fiber end face cleaner accommodated in a casing, which is constructed by holding and storing the laminated-type cleaner 100A shown in FIGS. 2A and 2B in a holder casing 200 formed with a cleaning window 210 through which the end faces of the optical fibers 510 can be pressed against the adhesive layer 120-1 of the foremost unit 100-1 for cleaning. Further, the holder casing 200 includes a spring 250 for urging the rearmost cleaner unit 100-n of the laminated-type cleaner 100A forward from the back side of the elastic base 110-n of the rearmost cleaner unit 100-n.

In the third embodiment constructed as above, the laminated-type cleaner 100A is held and stored in the holder casing 200, and in this state the end faces of the optical fibers 510 are pressed against the adhesive layer 120-1 of the foremost cleaner unit 100-1 for cleaning. This, further facilitates not only carrying and storing of the cleaner but also cleaning operation for cleaning the end faces of the optical fibers 510, since the laminated-type cleaner 100A is held in the stable holder casing. Further, since the pressing force for pressing the end faces of the optical fibers 510 is controlled by the spring 250, an appropriate pressing force can be obtained easily, thereby making it possible to enhance cleaning efficiency of the cleaner.

It is further understood by those skilled in the art that the foregoing are the preferred embodiments of the present invention, and that various changes and modification may be made thereto without departing from the spirit and scope thereof.

What is claimed is:

1. An optical fiber end face cleaner for cleaning an end face of an optical fiber by removing deposits on the end face of the optical fiber, said optical fiber end face cleaner comprising:

a plurality of laminated optical fiber end face cleaner units, each laminated optical fiber end face cleaner unit comprising:

one elastic base comprising an elastic member which has one flat surface of a predetermined size and which has a predetermined thickness in a direction perpendicular to the one flat surface; and one adhesive layer formed on a predetermined area of a surface of said one elastic base, for allowing the end face of the optical fiber to be pressed against a surface of said adhesive layer;

wherein the plurality of laminated optical fiber end face cleaner units are sequentially laminated such that the adhesive layer of one optical fiber end face cleaner unit is adhered to a back surface of the elastic base of an adjacent optical fiber end face cleaner unit, such that said laminated optical fiber end face cleaner units are able to be sequentially peeled off one by one from a foremost unit side.

2. An optical fiber end face cleaner as claimed in claim 1, wherein said adhesive layers of said laminated optical fiber end face cleaner units have respective areas which progressively decrease in size in a forward direction of lamination of said laminated optical fiber end face cleaner units.

3. An optical fiber end face cleaner as claimed in claim 1, further comprising a holder casing for holding and accommodating said laminated optical fiber end face cleaner units, said holder casing having a cleaning window formed therein for allowing the end face of the optical fiber to be pressed against said adhesive layer of a foremost one of said laminated optical fiber end face cleaner units to clean said end face.

4. An optical fiber end face cleaner as claimed in claim 2, further comprising a holder casing for holding and accommodating said laminated optical fiber end face cleaner units, said holder casing having a cleaning window formed therein for allowing the end face of the optical fiber to be pressed against said adhesive layer of a foremost one of said laminated optical fiber end face cleaner units to clean said end face.

5. An optical fiber end face cleaner as claimed in claim 3, wherein said holder casing comprises a spring for urging forward a rearmost one of said laminated optical fiber end face cleaner units held and accommodated therein, from a back side of said elastic base of said rearmost optical fiber end face cleaner unit.

6. An optical fiber end face cleaner as claimed in claim 4, wherein said holder casing comprises a spring for urging forward a rearmost one of said laminated optical fiber end face cleaner units held and accommodated therein, from a back side of said elastic base of said rearmost optical fiber end cleaner unit.

* * * * *